(12) United States Patent  (10) Patent No.: US 7,954,879 B2
Roccato et al.  (45) Date of Patent: Jun. 7, 2011

(54) VEHICLE DOOR SYSTEM

(75) Inventors: Maurizio Roccato, Moncalieri (IT); Paolo Canato, Candiolo (IT); Gunnar Lassl, Bohus (SE)

(73) Assignee: Ford Global Technologies, LLC, Dearborn, MI (US)

( * ) Notice: Subject to any disclaimer, the term of this patent is extended or adjusted under 35 U.S.C. 154(b) by 632 days.

(21) Appl. No.: 11/530,277

(22) Filed: Sep. 8, 2006

(65) Prior Publication Data

US 2007/0052259 A1  Mar. 8, 2007

(30) Foreign Application Priority Data

Sep. 8, 2005  (EP) ..................................... 05019530

(51) Int. Cl.
*B60J 5/04* (2006.01)
(52) U.S. Cl. ................ 296/146.6; 296/187.12
(58) Field of Classification Search ............... 296/146.6, 296/146.7, 202, 187.12, 193.06, 193.05, 296/203.03
See application file for complete search history.

(56) References Cited

U.S. PATENT DOCUMENTS

| | | | | |
|---|---|---|---|---|
| 3,944,278 A * | 3/1976 | Takahashi et al. | ......... | 296/146.6 |
| 5,094,034 A * | 3/1992 | Freeman | ......................... | 49/501 |
| 5,431,476 A * | 7/1995 | Torigaki | .................... | 296/187.12 |
| 5,518,290 A * | 5/1996 | Reinhard et al. | ........... | 296/146.6 |
| 5,806,917 A * | 9/1998 | Townsend | .................... | 296/202 |
| 5,895,088 A * | 4/1999 | Knott | ........................ | 296/187.12 |
| 5,908,216 A * | 6/1999 | Townsend | .................. | 296/146.6 |
| 6,053,565 A * | 4/2000 | Cho | ......................... | 296/187.12 |
| 6,517,142 B2 * | 2/2003 | Gehringhoff et al. | ...... | 296/146.6 |
| 6,663,166 B2 * | 12/2003 | Achleitner | ................. | 296/146.6 |
| 6,817,652 B2 * | 11/2004 | Graber et al. | .............. | 296/146.6 |
| 6,857,688 B2 * | 2/2005 | Morrison et al. | .......... | 296/146.7 |
| 7,048,323 B2 * | 5/2006 | Bodin et al. | ............... | 296/146.6 |
| 7,594,691 B2 * | 9/2009 | Koormann et al. | ...... | 296/187.12 |
| 7,597,352 B2 * | 10/2009 | Ootani et al. | ................. | 280/735 |
| 7,607,719 B2 * | 10/2009 | Abraham et al. | ........ | 296/187.03 |

* cited by examiner

*Primary Examiner* — Glenn Dayoan
*Assistant Examiner* — Gregory Blankenship
(74) *Attorney, Agent, or Firm* — Fredrick Owens; Joseph E. Root (57) ABSTRACT

There is provided a vehicle door system for a door of a road vehicle, for example an open-top or convertible vehicle. The door includes a first hinged region thereof and a second openable region thereof. Moreover, the assembly comprises a reinforcement member for inclusion within the door substantially from the hinged region thereof to the second openable region thereof. Furthermore, the assembly further includes a first retention mechanism at the first region and a second retention mechanism at the second region, the mechanisms being resilient in operation to impact or crash forces applied to the door to resist lateral movement of the door when the door is in a closed state.

22 Claims, 9 Drawing Sheets

Fig.8c

VEHICLE DOOR SYSTEM

TECHNICAL FIELD

The present invention relates to vehicle door systems operable to provide enhanced impact or crash protection, for example to reinforced vehicle door systems suitable for providing enhanced protection in open-top vehicles. Moreover, the invention further relates to component parts of such vehicle door systems.

BACKGROUND OF THE INVENTION

It is known that doors of vehicles represent vulnerable, or structurally weak, parts of such vehicles in potential impact or crash situations. Whereas a front portion of a vehicle, for example accommodating an engine, can be strengthened with various strengthening sills, space to accommodate strengthening features for vehicle doors is much more restricted. Of particular concern is to try to prevent doors of vehicles springing open or being pushed into the vehicles in impact situations, thereby potentially injuring occupants of the vehicles, while still allowing for the doors to be capable of being opened or removed, for example to gain access to the occupants immediately following accidents.

Various approaches have been proposed for strengthening doors of vehicles. For example, in a published German patent specification no. DE4133248, there is described a side crash protection system for a two-door passenger vehicle. The protection system comprises a three-part strip of metal and plastics material which extends, in operation, along front, door and tail sections of the vehicle. Joints are provided to two points to allow doors of the vehicle to open and close. Moreover, the protective strip can be extended to fit four door cars. Furthermore, the side crash protection system is alleged to be suitable for both old and new vehicles.

In another approach as described in a published United States patent application no. US2003/0025353, there is described a side impact support for incorporation into a door of a motor vehicle. The side impact support has a longitudinal profile with end portion towards the door column. Moreover, the impact support is configured asymmetrically with respect to its center transverse plane and has a reinforcement in a portion thereof corresponding to a sitting position of a passenger in the vehicle.

In the case of open-top vehicles, for example sports cars and cabriolets, doors and door surrounding members of such vehicles do not benefit from mechanical strength imparted by way of any vehicle roof structures. It is therefore necessary for the doors of such vehicles to be especially strong in order to withstand impacts, namely both front/rear impacts as well as lateral impacts. Whereas it is known to reinforce vehicle doors by including strengthening members therein, such measures are not in practice found to be entirely sufficient for providing desirable vehicle occupant safety. There arises therefore a technical problem of providing an improved approach to strengthening vehicle doors, and their associated surrounds.

SUMMARY OF THE INVENTION

An object of the invention is to provide a vehicle door system which is susceptible to better withstanding impacts and crashes, for example front/rear vehicle impacts.

According to a first aspect of the present invention, there a vehicle door system for a door of a road vehicle comprises first and second pillars of the vehicle. The system further comprises a reinforcement member for inclusion within the door substantially from a first hinged region thereof to a second openable region thereof. A first mechanism at the first region includes one or more engageable projections operable to be engaged when the door is in a closed state and subject to impact or crash forces. A second mechanism at the second region includes an abutment for the reinforcement member. The mechanisms are at least in part coupled to their respective pillars and the reinforcement member. The mechanisms resist lateral movement of the door when the door is in the closed state and subject to impact or crash forces.

One advantage of the invention is the ability to render the door more resilient to impact or crash forces, for example when the vehicle is an open-top vehicle.

In one embodiment of the vehicle door system, the one or more projections are operable to be disengaged when the door is in the closed state in normal non-impact situations, and also disengaged when the door is in an open state. Disengaging the one or more projections when the door is in a closed state but not subject to impact forces assists to ensure that the door is openable immediately after an impact or crash situation. As an alternative, the one or more projections can be operable to be mutually engaged when the door is in the closed state in normal non-impact situations, and disengaged when the door is in an open state.

Preferably, the one or more projections are elongate in a direction substantially parallel to a longitudinal axis of a lower region of the first pillar, and the one or more projections are arranged in operation to project in a direction substantially perpendicular to the axis of the first pillar. Such a disposition of the one or more projections is capable of rendering the system more resistant to impact or crash forces when the door is in a closed state.

The one or more projections are fabricated by at least one of preferred processes: casting, and machining from a solid piece of material. Such a manner of fabrication is susceptible to imparting to the system enhanced resistance against impact or crash forces.

The one or more projections of the preferred embodiment are disposed as linear arrays of projections on the first pillar and at an end of the reinforcement member. Such linear disposition of the projections helps to simplify the manufacture of the projections.

Preferably, in the vehicle door system, the mechanisms are mounted substantially at closest positions to central longitudinal axes of the pillars to reduce in operation rotation of the pillars in response to the impact or crash forces applied to the door. By mounting the mechanisms so as to reduce a tendency for the pillars to rotate during impact or crash situations, it improves preventing the door being forced into the vehicle or springing open during impact, thereby improving safety for occupants in the vehicle.

Preferably, the abutment of the second mechanism is a cast component of metal or metal alloy. Such a manner of fabrication is susceptible to rendering the second mechanism more robust in impact or crash situations. The abutment of the second mechanism may include a relatively more protruding upper abutment for receiving the reinforcement member, and a relatively less protruding lower door catch mechanism. Such an implementation provides improved resilience to impact or crash forces whilst enabling the door to function in an apparently conventional manner when being opened, closed and locked by occupants.

In a preferred embodiment of the vehicle door system, the abutment includes a recess on an upper portion thereof for receiving a projection of the reinforcement member when the door is in a closed state, the recess and the projection being operable to cooperate to resist downward movement of the door in impact or crash situations. Such resistance to downward movement of the door is susceptible to reducing a tendency for the door to become jammed into position against a lower reinforcement sill in impact or crash situations.

The reinforcement member is of substantially planar form, and includes one or more out-of-plane features to impart enhanced lateral strength to the reinforcement member. More preferably, the one or more out-of-plane features include one or more indented ridges. The reinforcement member may be fabricated from at least one of following: steel, aluminium, titanium, metal, or a metal alloy. In an alternative embodiment, the reinforcement member may be fabricated from one or more of following materials: sheet metal subject to indentation to increase its lateral strength, machined solid material, component sections which are joined together, or a casting.

Preferably, the system is adapted by including the reinforcement member substantially in operation along an upper edge of the door to provide impact or crash protection to the door when the road vehicle is of an open-top design. The system is of particular benefit in such open-top design vehicles as strength of doors is paramount to providing occupant protection as roof protection in such a situation is not available. Positioning the reinforcement member substantially along an upper edge of the door enables the reinforcement member in cooperation with an axial sill of the vehicle to provide the vehicle with enhanced structural rigidity in impact or crash situations, for example to resist a bending moment being applied to the sill in impact or crash situations.

The system may further include one or more airbags in a region below the reinforcement member within the door, the one or more airbags being operable to be deployed in impact or crash situations. Inclusion of the airbags makes the door system further capable of improving occupant safety in impact or crash situations, for example lateral impact situations.

According to a second aspect of the invention, there is provided a retention mechanism adapted for inclusion in a vehicle door system. The retention mechanism comprises an abutment for abutting in operation substantially onto a reinforcement member of a door when the door is in the closed state. The abutment is operable to resist the door being forced into the vehicle or springing open in response to impact or crash forces being applied to the door when the abutment is abutted onto the reinforcement member. Preferably, the abutment of the retention mechanism is a cast component of metal or metal alloy. Such a casting is susceptible to imparting the abutment with increased strength.

According to a third aspect of the invention, there is provided a retention mechanism adapted for inclusion in a vehicle door system. The retention mechanism comprises an arrangement of mutually engageable projections, the projections being operable to be mutually engaged when the door is in the closed state and subject to impact forces. The engageable projections are operable to resist the door being forced into or out of the vehicle, or springing open, by action of the impact or crash forces when the projections are mutually engaged. Preferably, a first portion of the projections are directly attachable to a reinforcement member included within the door and a second portion of the projections are attachable to a door pillar of the vehicle.

According to a fourth aspect of the invention, there is provided a method of providing a vehicle with impact or crash protection. The vehicle includes first and second door pillars adjacent to a door of the vehicle. The method comprises the steps of first including a reinforcement member in the door substantially from a first hinged region thereof to a second openable region thereof. The second step comprises including a first mechanism at the first region including one or more projections operable to be engaged when the door is in a closed state and subject to impact or crash forces. The third step comprises including a second mechanism at the second region including an abutment for the reinforcement member. The mechanisms are resistant in operation to impact or crash forces applied to the door susceptible to causing the door to move laterally when the door is in the closed state.

It will be appreciated that features of the invention are susceptible to being combined in any combination without departing from the scope of the invention as defined by the appended claims.

BRIEF DESCRIPTION OF THE DRAWINGS

By way of example only, embodiments of the invention will now be described with reference to the accompanying drawings wherein:

FIG. 3b is a schematic illustration of structural compression that can potentially occur in an open-top vehicle devoid of the elongate reinforcement member as shown in FIG. 3a;

DETAILED DESCRIPTION OF PREFERRED EMBODIMENTS

Figure 1:
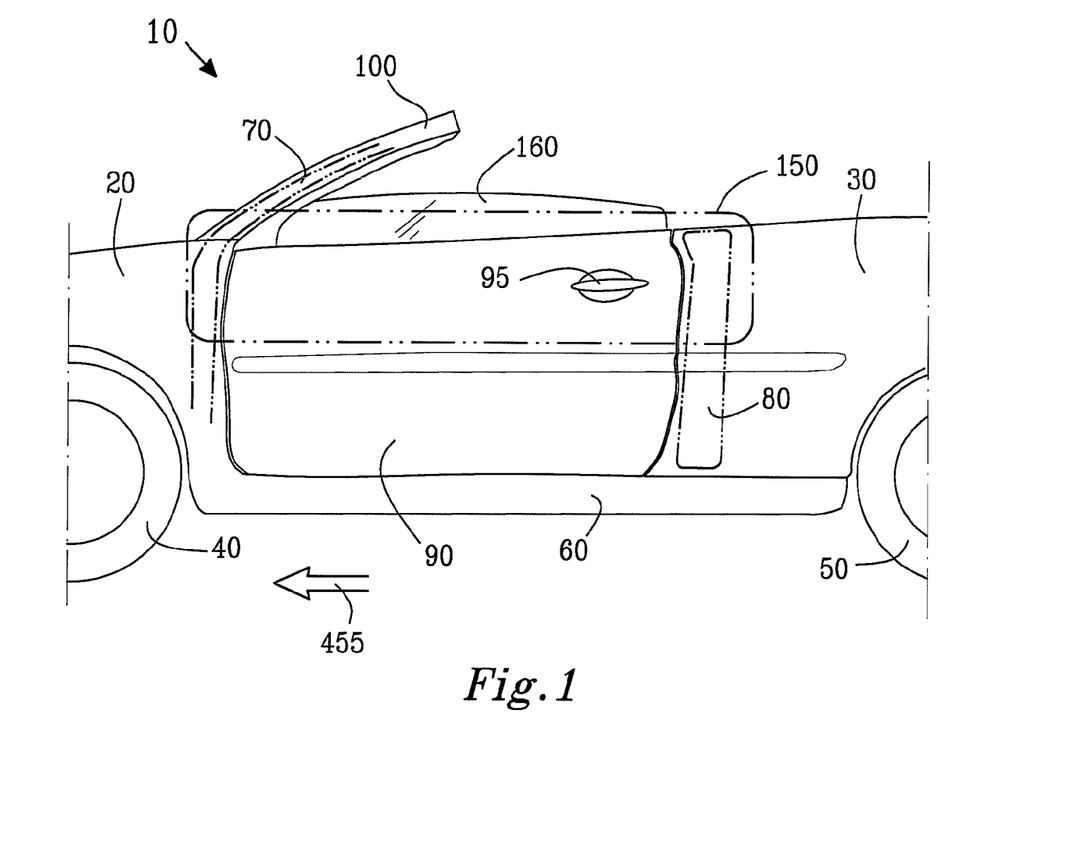
FIG. 1 is a schematic side view of a road vehicle, for example an open-top vehicle, illustrating a door of the vehicle provided with a vehicle door system pursuant to the present invention.

Referring to FIG. 1, there is shown a central portion of a road vehicle indicated generally by 10. The vehicle 10 is, for example, an open-top or convertible-styled vehicle such as a cabriolet. The vehicle 10 comprises a front portion 20 for housing an engine, and a rear portion 30 for accommodating rear occupants or luggage. Moreover, the vehicle 10 comprises two front wheels 40 and two rear wheels 50. In order to impart rigidity and strength to the vehicle 10, the vehicle 10 includes on each lateral side thereof a substantially horizontal strengthening sill 60, each sill 60 being coupled to a front pillar 70 and a rear pillar 80 providing a door surround to a door 90. The front and rear pillars 70, 80 are conveniently referred to as A-pillars and B-pillars respectively. Optionally, the front pillar 70 extends at least partially into a surround for a windscreen 100 of the vehicle 10 to impart to the windscreen 100 additional strength for coping with impact or crash situations, for example vehicle roll-over situations. The door 90 is operable to pivot at its front edge about an axis substantially adjacent and parallel to a longitudinal substantially-vertical axis of a lower portion of the front pillar 70. Moreover, the door 90 is operable to latch onto an abutment feature associated with the rear pillar 80. A door handle 95 is included for enabling the door 90 to be released from engagement with the aforesaid abutment feature, namely for opening the door 90.

In a region 150 of the vehicle 10, the door 90 includes a reinforcement member therein as will be further elucidated later. Moreover, where the region 150 is shown overlapping the first and second pillars 70, 80, retaining features are included which are operable to more effectively support the door 90 in an event of impact forces being applied to the door 90 in impact or crash situations.

Figure 2:
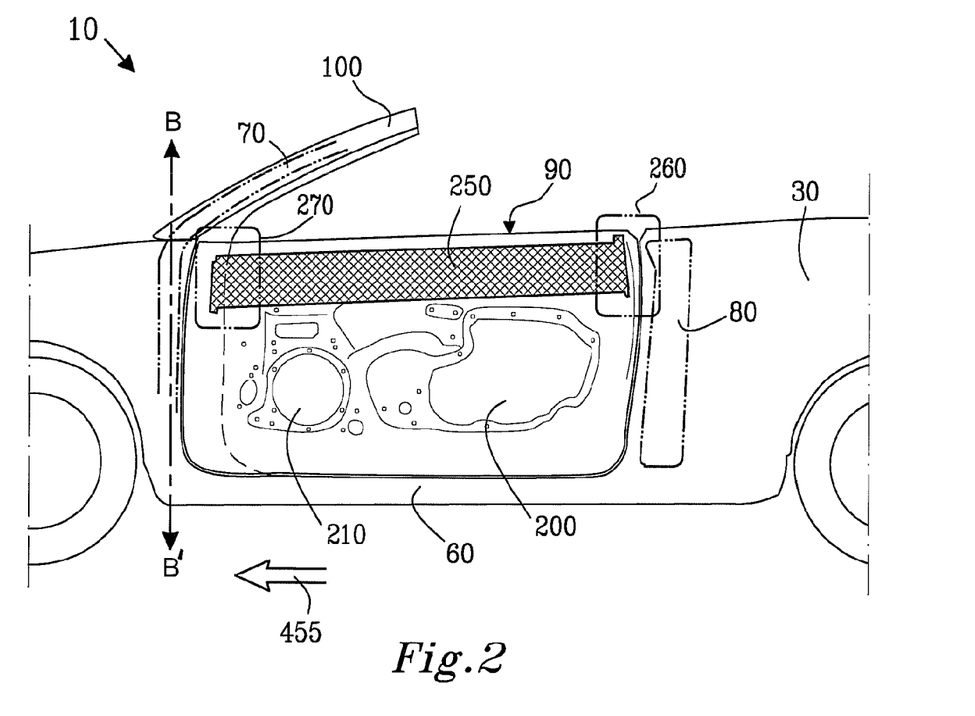
FIG. 2 is a cut-away schematic view of the door of FIG. 1 illustrating the vehicle door system comprising an elongate reinforcement member provided with retention mechanisms at its ends.

In FIG. 2, a portion of the door 90 is shown in cutaway. The aforementioned reinforcement member of the door 90 is denoted by 250. The reinforcement member 250 is substantially included at a top edge of the door 90 but concealed within inner and outer metal skins of the door 90. Metal sheet profiles employed to fabricate the door 90 include regions 210, 200 for accommodating an electric motor for raising and lowering a window of the door 90, and for housing airbag units deployable in lateral impact or crash situations. The reinforcement member 250 has front and rear regions denoted by 270, 260 respectively which will be elucidated in further detail later.

Figure 3A:
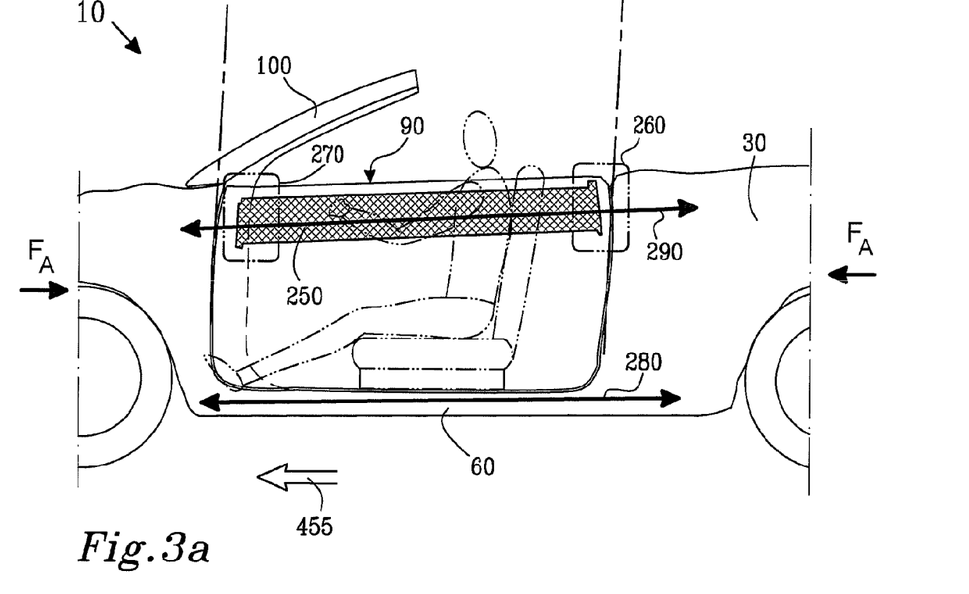
FIG. 3a is a cutaway schematic view of the door of FIG. 1 with door panels not shown to illustrate more clearly the elongate reinforcement member.

In FIG. 3a, the reinforcement member 250 is shown in simpler outline with its corresponding door 90 for clarity. Moreover, the front and rear regions 270, 260 are again highlighted. In operation, front and rear impact or crash forces are denoted by $F_A$. Such forces $F_A$ are coupled from front and/or rear regions of the vehicle 10 through a structural frame of the vehicle 10. In a vicinity of the door 10, the forces $F_A$ are coupled through the sill 60 as denoted by an arrow 280 and also through the reinforcement member 250 as denoted by an arrow 290 so as to try to resist compression in a crash or impact situation of a seating region accommodating a passenger or driver of the vehicle 10 as illustrated. In order that the strengthening member 250 is effective in resisting compression of the seating region, it is important that the retention mechanisms included at the regions 260, 270 are effective at preventing the reinforcement member 250 from springing into the vehicle 10 or out of the vehicle 10 in impact or crash situations.

Figure 3B:
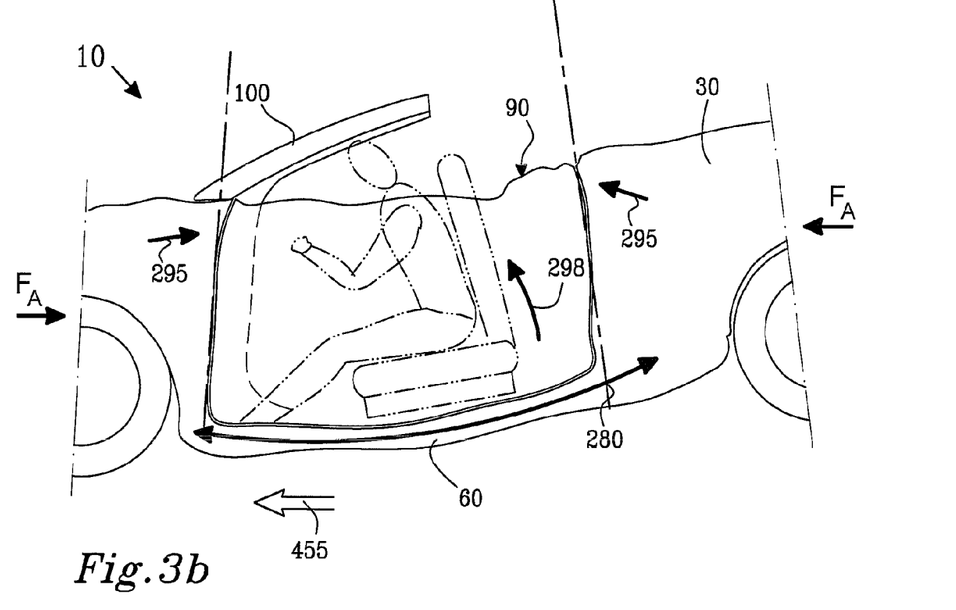

In order to elucidate benefits arising from including the reinforcement member 250, FIG. 3b illustrates a version of the vehicle 10 devoid of the reinforcement member 250 in the door 90. In the version of the vehicle 10 shown in FIG. 3b, the door 90 is potentially susceptible to buckling under impact or crash situations. Such buckling results in the forces $F_A$ giving rise to turning moments denoted by arrows 295 at the pillars 70, 80 which can potentially cause the sill 60 to be bent upwardly as denoted by an arrow 298. Such upward bending of the sill 60 can give rise to potential passenger or driver injury as shown.

Figure 4:
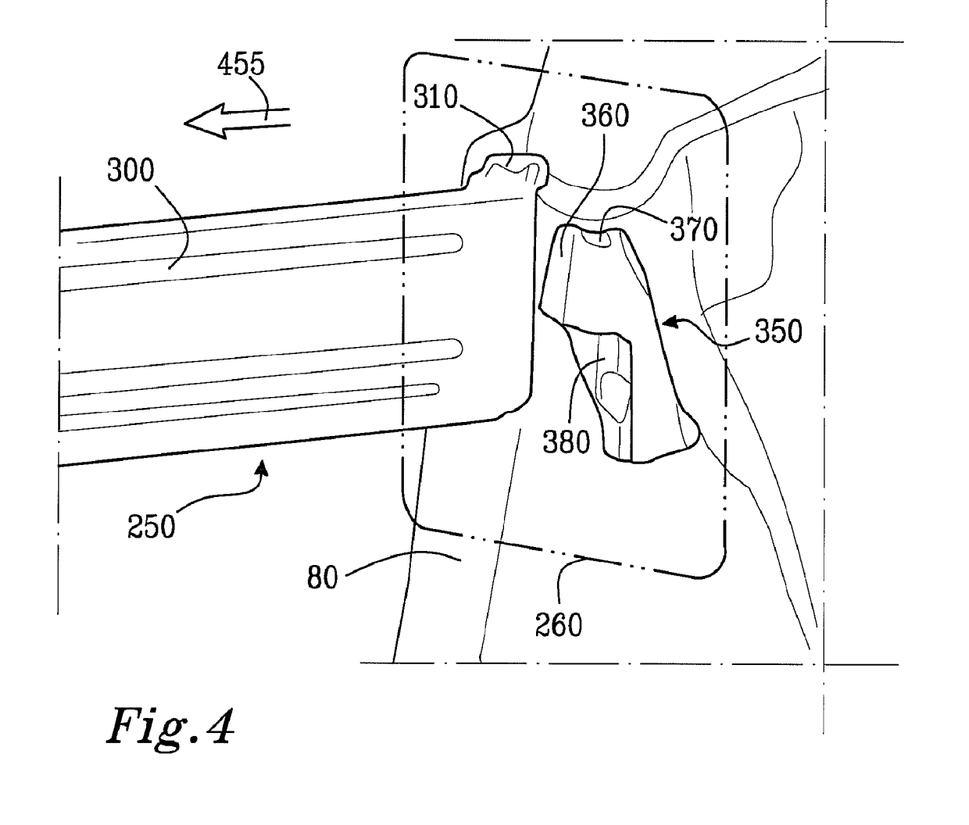
FIG. 4 is a schematic close-up view of a rear end of the reinforcement member together with its associated retention mechanism.

Referring now to FIG. 4, the rear region 260 is shown in greater detail; FIG. 4 shows a view from inside the vehicle 10 looking outward from the vehicle 10. The reinforcement member 250 is fabricated from steel, aluminium, titanium or similar light-weight strong metal or metal alloy. Alternatively, the member 250 can, at least in part, be fabricated from a composite, for example a carbon-fibre/resin composite. Optionally, the member 250 is fabricated from a sheet of material which is subsequently indented out-of-plane to provide the member 250 with increased lateral strength, for example, the member 250 is indented with various out-of-plane features such as an indent 300, for example one or more indented ridges having longitudinal axes substantially parallel to a longitudinal axis of the member 250 itself. Alternatively, the member 250 is susceptible to being machined from solid bar material, or being fabricated from component sections which are welded or otherwise firmly adjoined together. As a yet further alternative, the member 250 can be of cast metal or metal alloy construction.

At an extreme upper end of the member 250, there is included a projection 310. The second pillar 80 has firmly attached thereto a first retention mechanism indicated generally by 350. The first retention mechanism 350 is attached as closely as possible to a central longitudinal axis of the pillar 80 so as to reduce a risk of the second pillar 80 rotating when forces are applied to the first retention mechanism 350 under impact or crash situations; such rotation of the second pillar 80 can potentially cause the door 90 to spring loose during impact or crash situations with a result, as illustrated in FIG. 3b, that the sill 60 is susceptible then to being bent upwardly. In order to provide the first retention mechanism 350 with required strength, the first retention mechanism 350 optionally includes a solid cast component. Optionally, the first retention mechanism 350 is either firmly bolted or welded to the pillar 80. The first retention mechanism 350 includes a relatively larger upper portion 360 including a recess 370 for receiving the aforementioned projection 310 when the door 90 is in a closed state. Moreover, the first retention mechanism 350 also includes a lower recessed portion 380 comprising various elements for forming a catch for the door 90. The catch has associated therewith a lock for the door 90, the lock being operable by using the handle 95 for opening and closing the door 90. In operation, the first retention mechanism 350 is effective at hindering the reinforcement member 250 from springing into the vehicle 10 during impact or crash situations. Moreover, the projection 310 in cooperation with the recess 370 assists to reduce a tendency for the door 90 to be forced downwards under impact or crash situations. The projection 310 and its recess 370 are optionally susceptible to being modified so as to also resist the door 90 being forced upwards under impact or crash situations.

Figure 5:
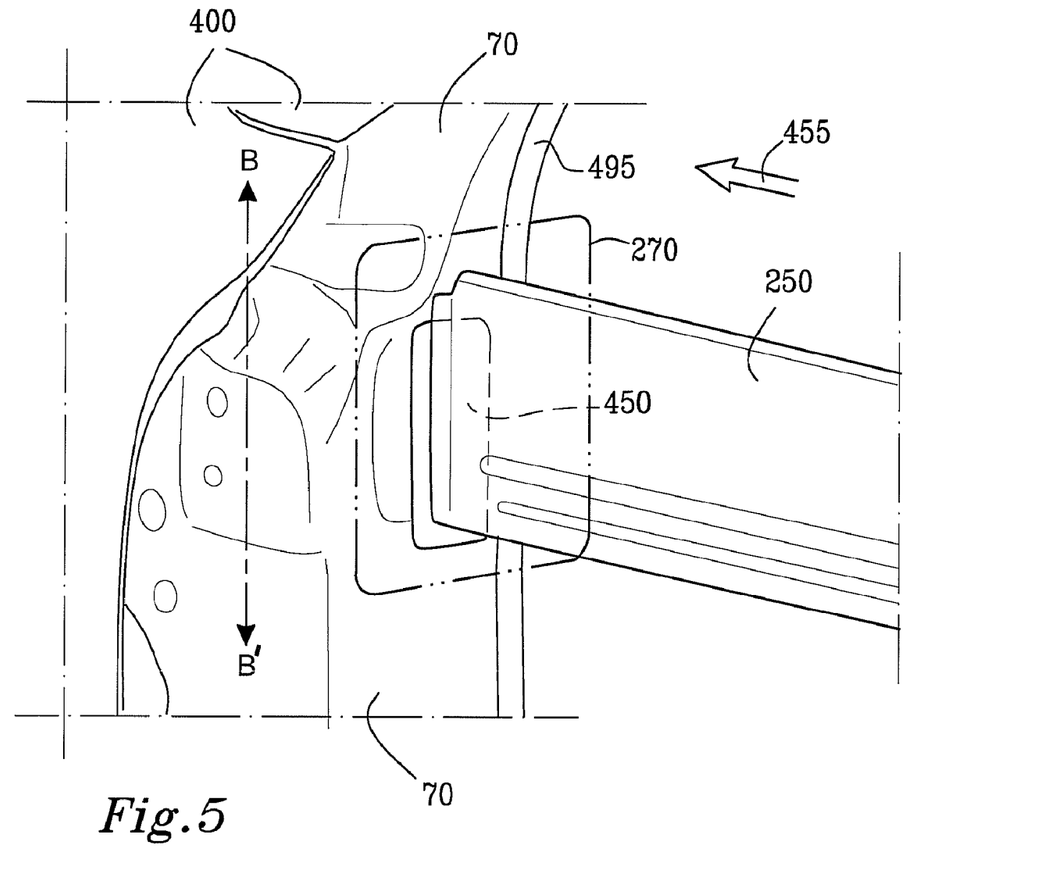
FIG. 5 is a schematic close-up view of a front end of the reinforcement member together with its associated retention mechanism.
Figure 6:
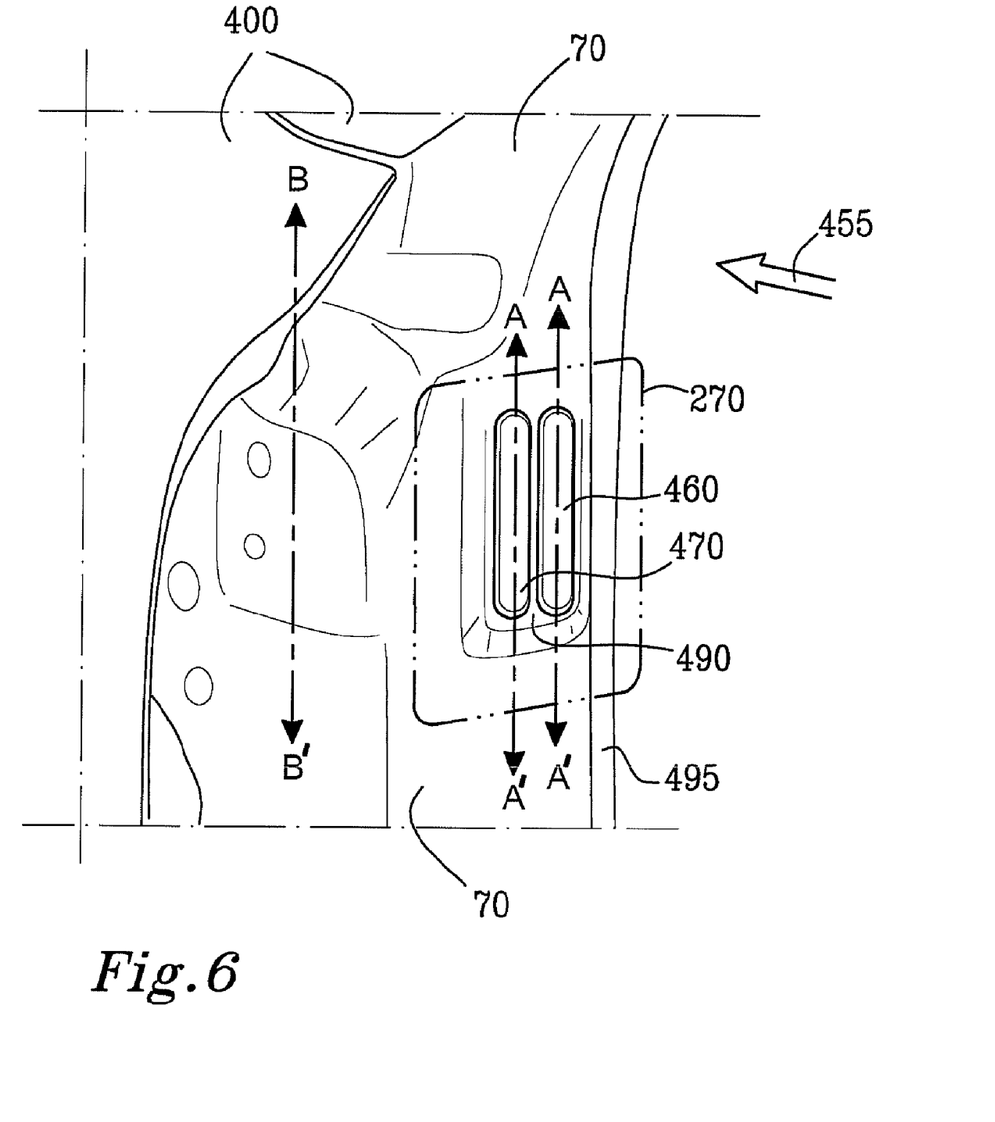
FIG. 6 is a schematic close-up view of the retention mechanism of FIG. 5.

Referring now to FIGS. 5 and 6, the front region 270 will now be further elucidated. In FIG. 5, internal trim of the vehicle 10 is denoted by 400 such that a view presented is from inside the vehicle 10 looking outwards from the vehicle 10. The front region 270 includes a second retention mechanism denoted by 450. The retention mechanism 450 is firmly adjoined to the first pillar 70 such that the first pillar 70 is resilient to rotating about its longitudinal axis B-B' in response to forces being applied to the second retention mechanism 450 during impact or crash situations. As will be elucidated in more detail later, whereas the first retention mechanism 350 at the rear region 260 relies on the reinforcement member 250 abutting onto an external-facing side of the first retention mechanism 350 when the door 90 is in a closed state, the front region 270 relies on its second retention mechanism 450 comprising one or more projections which are operable to be engaged when the door 90 is in a closed state and subject to crash or impact forces, for example the aforesaid forces $F_A$. Beneficially, the second retention mechanism 450 comprises a plurality of projecting teeth 460, 470 arranged to cooperate in an intermeshing manner in impact or crash situations; the projecting tooth 470 is mounted substantially onto the first pillar 70 whereas the projecting tooth 460 is mounted at a front end of the reinforcement member 250; the teeth 460, 470 are, for example, shown in greater detail in FIGS. 7a, 7b. The teeth 460, 470 are provided by components, for example cast components fabricated from metal, metal alloy or composite material such as carbon fibre composite, which are either bolted or welded to the reinforcement member 250 and the first pillar 70 In an alternative implementation, the second retention mechanism 450 is implemented as a ball-and-socket arrangement wherein the reinforcement member 250 includes at its front end a substantially hemispherically-ended projection operable to engage in crash or impact situations into a complementary hemispherical-form recess provided substantially in or adjacent to the first pillar 70. In a yet further alternative arrangement, the second retention mechanism 460 is implemented such that the aforementioned substantially hemispherically-ended projection is included substantially on or adjacent to the first pillar 70 and the aforesaid complementary hemispherical-form access is included substantially at the front end of the reinforcement member 250. Other implementations of the second retention mechanism 450 are feasible.

For reference in FIGS. 1 to 6, a normal forward direction of travel of the vehicle 10 is denoted by an arrow 455.

In FIG. 6, the second retention mechanism 450 is shown in greater detail, wherein the door 90 has been pivoted on its hinges away from the second retention mechanism 450 to reveal the projecting tooth 470 associated with the first pillar 70. A relative position of the tooth 460 associated with the door 90 is shown for reference. Each tooth 460, 470 has a longitudinal axis A-A' as illustrated. The axes A-A' of the teeth 460, 470 are substantially parallel to the aforementioned longitudinal axis B-B' of a lower region of the front pillar 70. The projecting tooth 470 is optionally provided on a raised plane or platform 490 provided on a side region of the front pillar 70.

On account of operation of the regions 260, 270 in combination with the reinforcement member 250 being important for implementing the present invention, the regions 270, 260 will be yet further elucidated with reference to FIGS. 7a, 7b, 8a, 8b and 8c; these FIGS. 7b, 8a, 8b and 8c provide plan-view illustrations of the regions 270, 260 respectively.

Figure 7A:
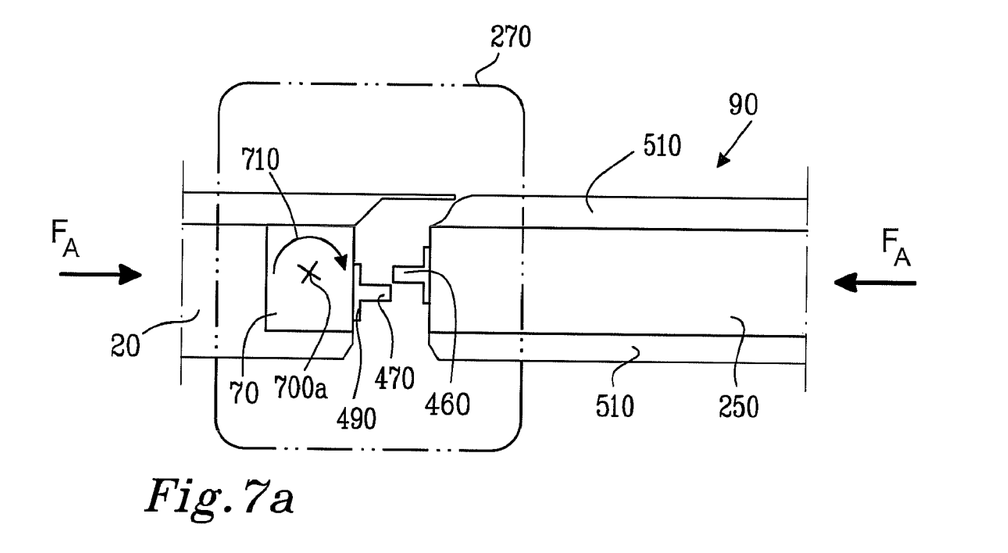
FIGS. 7a, 7b are schematic illustrations of operation of the retention mechanism as shown in FIG. 5 as disengaged and engaged states respectively.

In FIG. 7a, the door 90 is illustrated in a closed state in a state wherein it is not subject to crash or impact forces. The teeth 460, 470 are shown mutually non-intermeshed. In contradistinction, in the FIG. 7b, the teeth are shown mutually intermeshed as pertains when the door 90 is in the closed state and subject to axial impact forces, for example arising from a front and/or a rear impact or collision situation. The door 90 is susceptible to being preventing from springing into the vehicle 10 or springing loose from the vehicle 10 by way of a metal ridge 495 resisting outward movement of the reinforcement member 250 and a lateral abutment of the teeth 460, 470 resisting inward movement of the door 90 into the vehicle 10. Although one tooth 460, 470 on each of the front end of the reinforcement member 250 and the front pillar 70 is described, it will be appreciated that a greater number of teeth can be optionally included to provide enhanced strength of retention of the reinforcement member 250. Optionally, the teeth 460, 470 can be arranged to be mutually intermeshed also when the door 90 is in the closed state and in a non-impact situation. On account of the second retention mechanism 450 being included substantially along a longitudinal axis of the reinforcement member 250 whereat it substantially intersects the aforesaid axis B-B', the aforementioned axial forces $F_A$ applied to the region 270 when the teeth 460, 470 are mutually intermeshed do not cause the front pillar 70 to rotate as denoted by an arrow 710 around its central longitudinal axis denoted by 700a. Resilience of the pillar 70 to being rotated in response to the axial forces $F_A$ reduces a tendency for the retention mechanism 450 from being forced inwardly towards the vehicle 10 in an impact situation which could cause the teeth 460, 470 to potentially disengage.

Figure 7B:
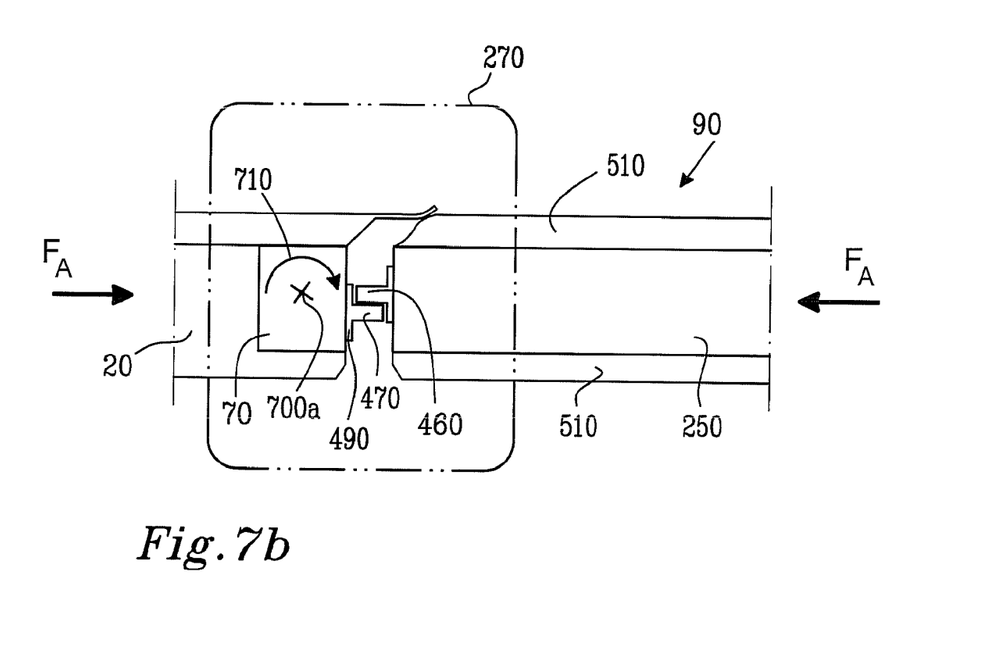

The retention mechanism 450 is also of benefit in that it is effective at resisting a lateral force $F_L$ during lateral impact or crash situations, and yet does not hinder or complicate opening of the door 90 in normal circumstances. The reinforcement member 250 is operable to cooperate with the sill 60 to resist the axial forces $F_A$ from bending the sill 60 upwards in a front or rear impact situation. Moreover, such cooperation is of benefit when the vehicle 10 is an open-top vehicle which substantially lacks structural support from any roof members. Thus, the retention mechanism 450 in cooperation with the reinforcement member 250 is capable of improving safety of the vehicle 10, not only with regard to lateral forces arising from, for example, lateral impacts but also with regard to axial forces arising from front and/or rear impacts.

Figure 8A:
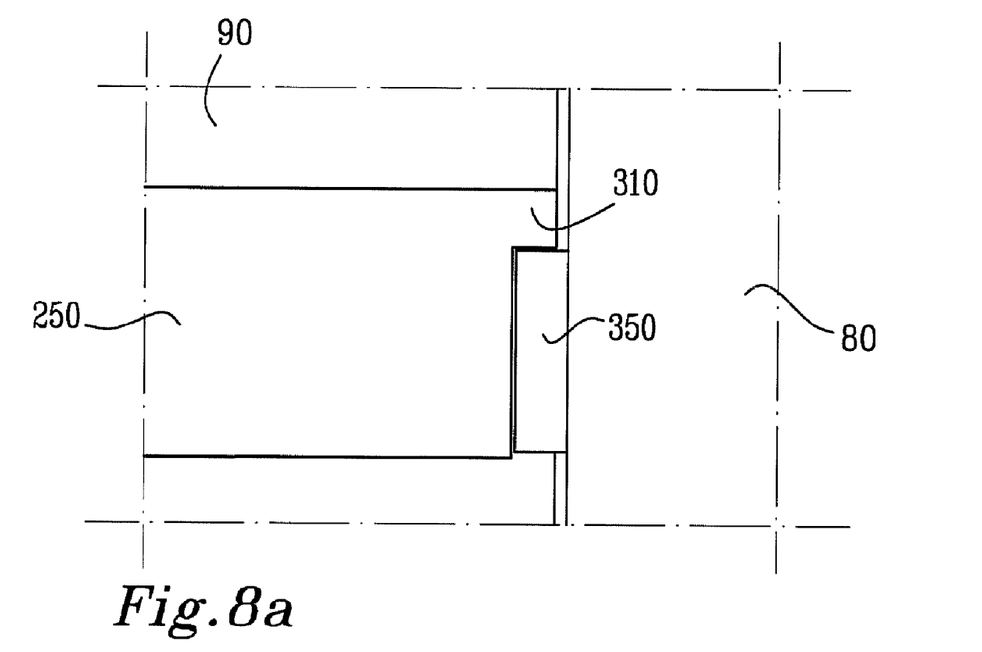
FIGS. 8a, 8b, 8c are schematic illustrations of the retention mechanism illustrated in FIG. 4 in side, plan-view closed and plan-view open views respectively.

In FIG. 8a, a spatial relationship of the aforesaid projection 310 of the door 90 to the retention mechanism 350 is illustrated. The projection 310 is operable to resist the door 90 being forced at least downwardly towards the sill 60 in a crash or impact situation, thereby resisting jamming of the door 90 against the sill 60.

Figure 8B:
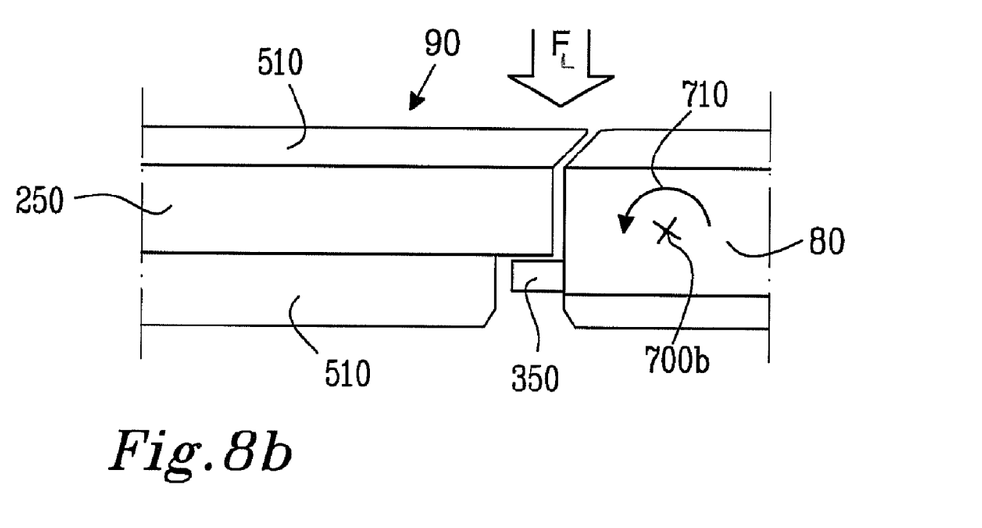

In FIG. 8b, the door 90 is illustrated in a closed state. The door 90 is illustrated as comprising the aforesaid reinforcement member 250 together with inner and outer metal sheet skins 510. An inside edge portion of the reinforcement member 250 is arranged to abut onto the first retention mechanism 350 as illustrated to render the door 90 resilient to the lateral force $F_L$ causing the door 90 to be pushed inwards into the vehicle 10. The rear pillar 80 is designed to be resilient to being rotated as denoted by an arrow 710 about its longitudinal axis 700b in response to the force $F_L$, thereby assisting to prevent the door 90 disengaging from the engagement mechanism 350 during lateral impact or crash situations. The first retention mechanism 350 is also effective at ensuring that the door 90 remains in a closed state when subjected to aforementioned axial forces $F_A$ arising, for example, when the vehicle 10 is subjected to front and/or rear impacts. As elucidated earlier, the reinforcement member 250 cooperates with the sill 60 to provide the vehicle 10 with enhanced structural strength in impact or crash situations is illustrated in FIGS. 3a and 3b. Moreover, the reinforcement member 250 is most effective at resisting bending of the sill 60 when spaced apart as far as practical therefrom, namely substantially at an upper edge of the door 90.

Figure 8C:
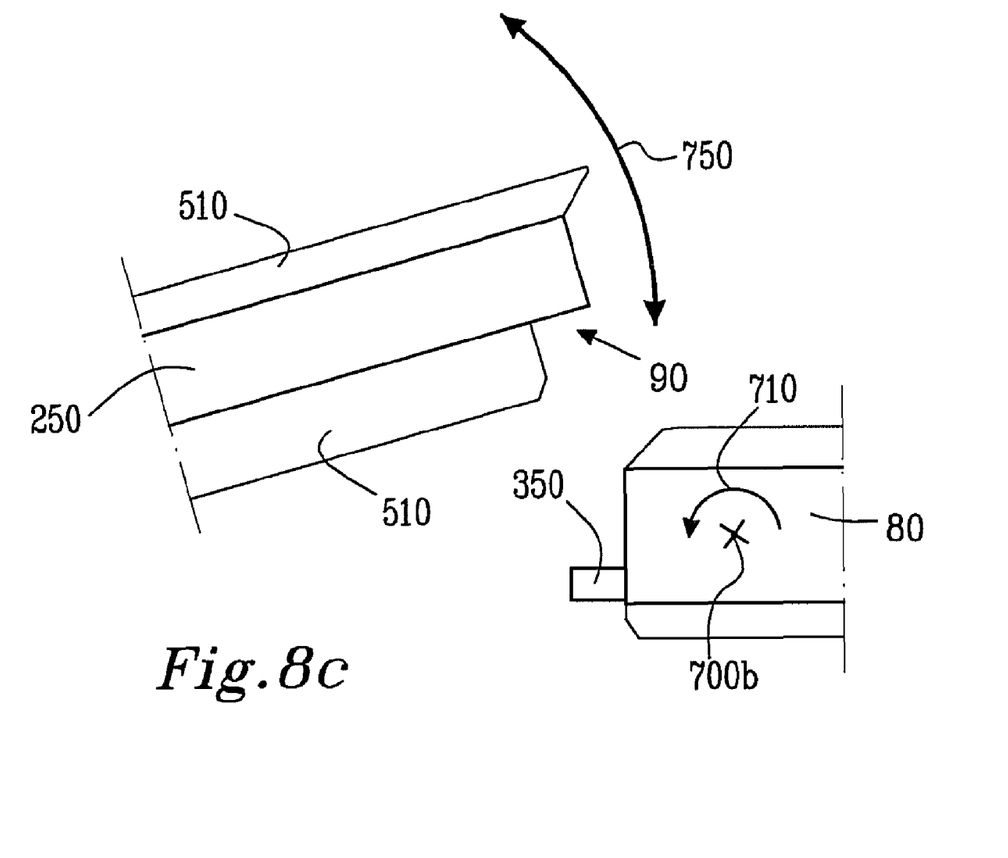

In FIG. 8c, the door 90 is illustrated in an opened state by way of a rotation 750 about its hinges included in a vicinity of the front region 270. In the opened state, the aforesaid inside edge portion of the member 250 disengages from the first retention mechanism 350 enabling an occupant to exit or enter the vehicle 10.

In conclusion, the present invention concerns a combination of the reinforcement member 250, the retention mechanisms 350, 450, and the pillars 80, 70 at the regions 260, 270 respectively which imparts to the door 90 ease of use whilst resilience to being pushed into the vehicle 10 or springing open during impact or crash situations. Moreover, the mechanisms 350, 450, the pillars 80, 70 and the reinforcement member 250 are cooperatively operable to impart to the vehicle 10 axial rigidity which reduces a bending moment experienced by the sill 60 in a region of the door 90 in front and/or rear impact situations as illustrated in FIG. 3b.

The first and second pillars 70, 80 respectively cooperate to provide such a desirably robust characteristic by being designed to be resilient to rotation about their associated longitudinal axes 700a, 700b. Moreover, the first retention mechanism 350 is mounted so as to be as close as possible to the axis 700b of the second pillar 80 to reduce a turning moment applied thereto in crash or impact situations when the door 90 is subjected to impact forces; the first retention mechanism 350 is preferably mounted at a position on the second pillar 80 substantially whereat the aforesaid longitudinal axis of the reinforcement member 250 intersects with an outer surface of the second pillar 80 when the door 90 is in the closed state. Furthermore, the second retention mechanism 450 is also mounted so as to be as close as possible to the axis 700a of the first pillar 70 as possible to reduce a turning moment applied thereto in crash or impact situations, namely substantially at a position whereat the longitudinal axis of the reinforcement member 250 intersects onto an outer surface of the first pillar 70 when the door 90 is in the closed state.

It will be appreciated that embodiments of the invention described in the foregoing are susceptible to being modified without departing from the scope of the invention as defined by the accompanying claims.

Numerals included within parentheses in the accompanying claims are included to assist appreciation of subject matter claimed in the accompanying claims and are not intended to limit scope of the claims.

Expressions such as "comprise", "include", "consist of", "incorporate", "have" and "is" are intended to be construed non-exclusively, namely such expressions do not exclude other components, items or elements being present which are not explicitly described or disclosed.

The invention claimed is:

1. A vehicle door system for a door of a road vehicle, the system including:
    first and second pillars of the vehicle;
    a reinforcement member for inclusion within the door substantially from a first hinged region thereof to a second openable region thereof, wherein the longitudinal axis of the reinforcement member substantially intersects the longitudinal axis of the first pillar;
    a first mechanism at the first region including one or more engageable projections on the first pillar and one or more engageable projections at the end of the reinforcement member, the longitudinal axis of the projections being substantially parallel to the longitudinal axis of the first pillar, and the axis normal to the longitudinal axis of the projections on the first pillar being substantially parallel to the axis normal to the longitudinal axis of the projections at the end of the first pillar, the one or more projections being operable to be engaged when the door is in a closed state and subject to impact forces; and
    a second mechanism at the second region including an abutment for the reinforcement member, the mechanisms being at least in part coupled to their respective pillars and to the reinforcement member, and the mechanisms resisting in operation lateral movement of the door when the door is in the closed state and subject to impact or crash forces.

2. A vehicle door system as claimed in claim 1, wherein the one or more projections are operable to be disengaged when the door is in the closed state in normal non-impact situations, and also disengaged when the door is in an open state.

3. A vehicle door system as claimed in claim 1, wherein the one or more projections are operable to be mutually engaged when the door is in the closed state in normal non-impact situations, and disengaged when the door is in an open state.

4. A vehicle door system as claimed in claim 1, wherein the one or more projections are elongate in a direction substantially parallel to a longitudinal axis of a lower region of the first pillar.

5. A vehicle door system as claimed in claim 1, wherein the plurality of projections are at least one of: cast solid material, or machined solid material.

6. A vehicle door system as claimed in claim 1, wherein the one or more projections are disposed as linear arrays of projections on the first pillar and at an end of the reinforcement member.

7. A vehicle door system as claimed in claim 1, wherein the mechanisms are mounted substantially at positions closest to central longitudinal axes of the pillars to reduce in operation rotation of the pillars in response to the impact or crash forces applied to the door, the closest positions being substantially whereat a longitudinal axis of the reinforcement member intersects with the pillars when the door is in the closed state.

8. A vehicle door system as claimed in claim 1, wherein the abutment of the second mechanism includes a relatively more protruding upper abutment for receiving the reinforcement member, and a relatively less protruding lower door catch mechanism.

9. A vehicle door system as claimed in claim 8, wherein the abutment includes a recess on an upper portion thereof for receiving a projection of the reinforcement member when the door is in the closed state, the recess and the projection being operable to cooperate to resist downward movement of the door in impact or crash situations.

10. A vehicle door system as claimed in claim 1, wherein the reinforcement member is of substantially planar form, and includes one or more out-of-plane features to impart enhanced lateral strength to the reinforcement member.

11. A vehicle door system as claimed in claim 10, wherein the one or more out-of-plane features include one or more indented ridges.

12. A vehicle door system according to claim 1, wherein the reinforcement member is fabricated from at least one of steel, aluminium, titanium, metal, and metal alloy.

13. A vehicle door system according to claim 1, wherein the reinforcement member is fabricated from one or more of: sheet metal subject to indentation to increase its lateral strength; machined solid material; component sections which are joined together; and casting.

14. A vehicle door system according to claim 1, wherein the system is adapted by including the reinforcement member substantially in operation along an upper edge of the door to provide impact or crash protection to the door when the road vehicle is of an open-top design.

15. A vehicle door system as claimed in claim 1, wherein the abutment of the second mechanism abuts in operation substantially onto the reinforcement member of the door when the door is in a closed state, the abutment being operable to resist the door being forced into the vehicle or springing open during impact in response to impact or crash forces being applied to the door when the abutment is abutted onto the reinforcement member.

16. A vehicle door system as claimed in claim 15, wherein the abutment of the second mechanism is a cast component of metal or metal alloy.

17. A vehicle door system as claimed in claim 15, wherein the abutment includes a relatively more protruding abutment for the reinforcement member, and a relatively less protruding door catch mechanism.

18. A retention mechanism adapted for inclusion in a vehicle door system, the vehicle door system including first and second pillars of the vehicle, and further comprising a reinforcement member for inclusion within the door substantially from a first hinged region thereof to a second openable region thereof, wherein the longitudinal axis of the reinforcement member substantially intersects the longitudinal axis of the first pillar, the retention mechanism comprising:

one or more engageable projections on the first pillar and one or more engageable projections on the reinforcement member, the longitudinal axis of the projections being substantially parallel to the longitudinal axis of the first pillar, wherein:

the one or more projections being operable to be engaged when the door is in a closed state and subject to impact forces, and the one or more engageable projections being operable to resist the door being forced into or out of the vehicle, or springing open, by action of the impact forces when the one or more projections are engaged.

19. A retention mechanism as claimed in claim 18, wherein a first portion of the projections are directly attachable to the reinforcement member included within the door and a second portion of the projections are attachable to the first or second door pillar of the vehicle.

20. A reinforcement member adapted to implement a vehicle door system, the door system including first and second pillars of the vehicle, the reinforcement member comprising:

an elongate form defining first and second ends thereof;

wherein:

the longitudinal axis of the reinforcement member substantially intersects the longitudinal axis of the first pillar; and one of the ends includes one or more projections for engaging in operation into complementary projections or recesses for imparting the reinforcement member with resistance to impact or crash forces, the one or more projections being arranged in operation to project in a direction substantially parallel to the axis of the reinforcement member and the one or more projections being elongate in a direction substantially parallel to the axis of the first pillar.

21. A vehicle door system for a door of a road vehicle, the system including:

first and second pillars;

a reinforcement member for inclusion within the door, extending substantially from a first hinged region thereof to a second openable region thereof;

a first mechanism at the first region including one or more engageable projections in the first pillar and one or more projections off the end of the reinforcement member, the longitudinal axis of the projections being substantially parallel to the longitudinal axis of the first pillar, the one or more projections being operable to be engaged when the door is in a closed state and subject to impact forces; and a second mechanism at the second region including an abutment for the reinforcement member, the abutment including, a relatively more protruding upper abutment for receiving the reinforcement member, and a relatively less protruding lower door catch mechanism; and a recess on the upper abutment for receiving a projection of the reinforcement member when the door is in the closed state, the recess and the projection being operable to cooperate to resist downward movement of the door in impact or crash situations;

the mechanism being at least in part coupled to their respective pillars and to the reinforcement member, and the mechanisms resisting in operation lateral movement of the door when the door is in the closed state and subjected to impact or crash forces.

22. A vehicle door system as claimed in claim 21, wherein the abutment is a cast component of metal or metal alloy.

* * * * *

UNITED STATES PATENT AND TRADEMARK OFFICE
CERTIFICATE OF CORRECTION

| | | |
|---|---|---|
| PATENT NO. | : 7,954,879 B2 | Page 1 of 1 |
| APPLICATION NO. | : 11/530277 | |
| DATED | : June 7, 2011 | |
| INVENTOR(S) | : Maurizio Roccato et al. | |

It is certified that error appears in the above-identified patent and that said Letters Patent is hereby corrected as shown below:

On Face Page, in column 1, in field (73), in "Assignee", delete "Ford Global Technologies, LLC, Dearborn, MI (US)" and insert -- Volvo Car Corporation, Goteborg, Sweden --, therefor.

Signed and Sealed this
Twenty-third Day of August, 2011

David J. Kappos
*Director of the United States Patent and Trademark Office*